United States Patent
Li et al.

(10) Patent No.: US 7,634,187 B2
(45) Date of Patent: Dec. 15, 2009

(54) DYNAMIC AUTO-FOCUS WINDOW SELECTION THAT COMPENSATES FOR HAND JITTER

(75) Inventors: Jingqiang Li, San Diego, CA (US); Szepo Hung, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 11/619,694

(22) Filed: Jan. 4, 2007

(65) Prior Publication Data

US 2008/0166117 A1     Jul. 10, 2008

(51) Int. Cl.
G03B 13/34     (2006.01)
(52) U.S. Cl. ...................................... 396/121; 348/351
(58) Field of Classification Search ................. 396/121, 396/123, 128; 348/348, 351
See application file for complete search history.

(56) References Cited

U.S. PATENT DOCUMENTS

| | | | |
|---|---|---|---|
| 5,187,585 A | | 2/1993 | Kaneda et al. |
| 5,561,498 A | * | 10/1996 | Sekine et al. ................. 396/53 |
| 6,317,114 B1 | * | 11/2001 | Abali et al. ................. 345/672 |
| 2005/0122402 A1 | | 6/2005 | Kumaki |
| 2006/0066744 A1 | | 3/2006 | Stavely et al. |
| 2007/0035630 A1 | * | 2/2007 | Lindenstruth et al. .. 348/208.99 |
| 2007/0092244 A1 | * | 4/2007 | Pertsel et al. ................ 396/153 |

FOREIGN PATENT DOCUMENTS

EP     0682449     11/1995

OTHER PUBLICATIONS

International Search Report—PCT/US08/050043, International Search Authority—European Patent Office—Apr. 2, 2008.

* cited by examiner

*Primary Examiner*—Melissa J Koval
*Assistant Examiner*—Autumn Parker
(74) *Attorney, Agent, or Firm*—Alexander C. Chen; Espartaco Diaz Hidalgo

(57) ABSTRACT

The invention relates to methods and devices for mitigating and/or minimizing effects of hand jitter or shaking during an auto-focusing process of an image-capturing device. In order to more accurately focus a lens for capturing a digital image, the lens is moved between a minimum and maximum position (along an axis) while capturing sample image frames using a focus window at various lens positions. Improved auto-focusing is achieved by dynamically adjusting the relative position of the focus window for each image frame to cover substantially the same image portion of the target image. By adjusting the focus window for each image frame to cover substantially the same image portion of the target image, variations from shaking may be minimized, thereby improving auto-focusing.

30 Claims, 4 Drawing Sheets

DYNAMIC AUTO-FOCUS WINDOW SELECTION THAT COMPENSATES FOR HAND JITTER

BACKGROUND

1. Field

Various examples relate generally to image-capturing devices and, more particularly, to an auto-focusing method for devices such as digital cameras.

2. Background

In typical digital cameras, auto-focusing involves moving a lens in and out to hunt for the greatest contrast levels within a focus window. During this auto-focusing process, photosensors for the digital camera are "on" continuously to capture contrast levels. The lens position where the greatest contrast levels are captured is selected as the in-focus position. Such auto-focusing process may take a few seconds to complete. During such time, the camera may move, shake, or jitter as a result of movement of the user's hand when holding a camera. Even if the user is unaware of the movement, the hand is continually moving. When this occurs, the focus window may capture slightly different image areas at different points in the focusing process. Because slightly different image areas may be used to make the contrast determinations, with each image having potentially different objects therein, an optimal focus position may not be achieved. That is, a particular lens position may be falsely identified as providing the greatest contrast levels.

SUMMARY

It may be desirable to provide a method for accurately auto-focusing a device such as a camera even when the camera moves, shakes, or jitters during auto-focusing.

A method for capturing an image is provided. A first image frame having a first focus window and a second image frame having a second focus window are obtained. A first motion vector between the first and second image frames is obtained. A third image frame is obtained having a third focus window adjusted by the first motion vector to cover substantially the same target image portion as the first focus window. A plurality of other image frames may also be obtained, each image frame having its focus window adjusted by an associated motion vector between previous focus windows to cover substantially the same target image portion as the previous focus windows. The previous focus windows may immediately precede the image frame that has its focus window adjusted by the motion vector. An image frame having the most contrast from the plurality of image frames. A focus window may cover only a portion of an image being photographed.

A focus window associated with an image frame having the most contrast from the plurality of image frames may be identified and/or selected. The image-capturing device may be focused by using a lens position associated with the selected focus window. A digital photograph may then be obtained using the lens position. Each focus window may correspond to a different lens position. In one example, the image frames may be obtained at a frequency of fifteen (15) frames per second or greater.

The first focus window may have an associated first reference point relative to an image being photographed, and the second focus window has an associated second reference point relative to an image being photographed, the first motion vector obtained by taking the difference between the first and second reference points.

An image-capturing device is provided comprising an image sensor and/or an auto-focus module. The image sensor may allow capturing image frames. The auto-focus module may be coupled to the image sensor and configured to: obtain a first image frame having a first focus window; obtain a second image frame having a second focus window; obtain a first motion vector between the first and second image frames; obtain a third image frame having a third focus window adjusted by the first motion vector to cover substantially the same target image portion as the first focus window; and/or obtain a plurality of image frames, each image frame having its focus window adjusted by an associated motion vector between previous focus windows to cover substantially the same target image portion as the previous focus windows. The auto-focus module may be further configured to: identify an image frame having the most contrast from the plurality of image frames; select a focus window associated with the image frame having the most contrast from the plurality of image frames; and/or focus the image-capturing device by using a lens position associated with the selected focus window. The first focus window may also have an associated first reference point relative to an image being photographed, and the second focus window has an associated second reference point relative to an image being photographed, the first motion vector obtained by taking the difference between the first and second reference points.

The image-capturing device may also include a lens adjustment module coupled to the auto-focus module. The lens adjustment module may be configured to adjust a lens between a minimum and maximum range of positions, wherein the image frames are obtained at various lens positions within the range. A focus window may cover only a portion of an image being photographed.

In one example, the auto-focus module may include: a focus window module to determine the focus windows; an image capture module to capture the image frames; and/or a motion vector calculation module to obtain motion vectors between an image frame and a previous image frame.

An image-capturing device is also provided and comprises means for obtaining a first image frame having a first focus window; means for obtaining a second image frame having a second focus window; means for obtaining a first motion vector between the first and second image frames; means for obtaining a third image frame having a third focus window adjusted by the first motion vector to cover substantially the same image portion as the first focus window; means for obtaining a plurality of image frames, each image frame having its focus window adjusted by an associated motion vector between previous focus windows to cover substantially the same target image portion as the previous focus windows; means for selecting a focus window associated with an image frame having the most contrast from the plurality of image frames; means for focusing the image-capturing device using a lens position associated with the selected focus window; and/or means for obtaining a digital photograph using the lens position. The first focus window may have an associated first reference point relative to an image being photographed, and the second focus window has an associated second reference point relative to an image being photographed, the first motion vector obtained by taking the difference between the first and second reference points.

A computer-readable medium is also provided having one or more instructions operational on an image-capturing device to mitigate the effects of shaking during auto-focusing, which when executed by a processor causes the processor to: obtain a first image frame having a first focus window; obtain a second image frame having a second focus window; obtain a first motion vector between the first and second image frames; obtain a third image frame having a third focus window adjusted by the first motion vector to cover substantially the same image portion as the first focus window; obtaining a plurality of image frames, each image frame having its focus window adjusted by an associated motion vector between previous focus windows to cover substantially the same target image portion as the previous focus windows.

The computer-readable medium may also include one or more instructions which when executed by a processor causes the processor to further: identify an image frame having the most contrast from the plurality of image frames; select a focus window associated with the image frame having the most contrast from the plurality of image frames; and/or focus the image-capturing device by using a lens position associated with the selected focus window. The first focus window may have an associated first reference point relative to an image being photographed, and the second focus window has an associated second reference point relative to an image being photographed, the first motion vector obtained by taking the difference between the first and second reference points. The computer-readable medium may also include one or more instructions which when executed by a processor causes the processor to further: adjust a lens between a minimum and maximum range of positions, wherein the image frames are obtained at various lens positions within the range. A focus window may cover only a portion of an image being photographed. The image frames may be obtained at a frequency of fifteen (15) frames per second or greater.

DETAILED DESCRIPTION

Figure 1:
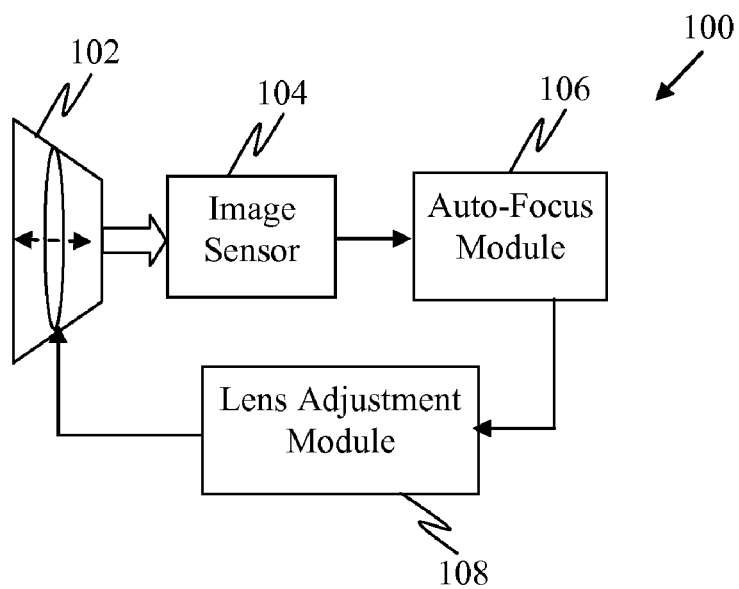
FIG. 1 is a block diagram illustrating an image-capturing device that may be configured to implement dynamic auto-focus window selection.

In the following description, specific details are given to provide an understanding of the examples. However, it will be understood by one of ordinary skill in the art that the examples may be practiced without some specific details. For instance, circuits may not be shown in block diagrams in order not to obscure the examples in unnecessary detail. Also, it is noted that the examples may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Furthermore, various configurations may be implemented by hardware, software, firmware, middleware, microcode, or a combination thereof. When implemented in software, firmware, middleware, or microcode, the program code or code segments to perform the described tasks may be stored in a computer-readable medium such as a storage medium or other storage means. A processor may perform the defined tasks. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, and the like, may be passed, forwarded, or transmitted via a suitable means including memory sharing, message passing, token passing, and network transmission, among others. The methods disclosed herein may be implemented in hardware, software, or both.

If functions are implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Moreover, a storage medium may represent one or more devices for storing data, including read-only memory (ROM), random access memory (RAM), magnetic disk storage mediums, optical storage mediums, flash memory devices, and/or other computer-readable mediums for storing information.

The various illustrative functions, logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One feature provides a method and device for mitigating and/or minimizing the effects of hand jitter or shaking during the auto-focusing process of an image-capturing device. In order to more accurately focus a lens for capturing a digital target image, the lens is moved between a minimum and maximum position (along an axis) while capturing sample image frames using a focus window at various lens positions. Improved auto-focusing is achieved by dynamically adjusting the relative position of the focus window for each image frame to cover substantially the same image portion of the target image. By adjusting the focus window for each image frame to cover substantially the same image portion of the target image, variations from jitter/shaking are minimized, thereby improving auto-focusing.

FIG. 1 is a block diagram illustrating an image-capturing device that may be configured to implement dynamic auto-focus window selection. The image-capturing device 100 may include a lens 102, an image sensor 104, an auto-focus module 106, and a lens adjustment module 108. The lens 102 serves to focus a target image onto the image sensor 104. The image sensor 104 may convert the target image, or portion thereof, into an electrical signal. For example, the image sensor 104 may include a plurality of photosensors or pixel sensors, such as charged-coupled devices (CCD) or complementary metal-oxide-semiconductor (CMOS) sensors, arranged in an array. For instance, the photosensors may be configured as a Bayer filter, Foveon X3 sensor, or a trichroic prism assembly (3CCD), among other configurations. The photosensors obtain sampled pixel values that form a digital image.

In one configuration, the image sensor 104 captures image frames during an auto-focusing process under the control of the auto-focus module 106. The auto-focus module 106 causes the lens adjustment module 108 to move the position of the lens 102 between a start position and an end position along an axis. That is, the lens 102 is moved toward and/or away from the target image to find a lens position where the target image is in focus. As the lens position is adjusted, a plurality of image frames are captured by the image sensor 102 and provided to the auto-focus module 106. A focus window may be defined through which a portion of the target image is captured to obtain each image frame.

During an auto-focusing process, a plurality of image frames may be obtained (each frame associated with different lens positions) capturing a portion of a target image. Sequential image frames (i.e., a base frame and a movement frame) are selected. Any horizontal and/or vertical movement (displacement) between the base frame and the movement frame may be represented as a motion vector. The motion vector between a base image frame pair may be used to adjust the location of a focus window for the next image frame. By adjusting the relative position of the focus window, the next image frame captures substantially the same portion of the target image as the base image frame. This process may be repeated for a plurality of sequential image frames to adjust the relative position of the focus window for the next image frame. In one example, an image frame may be coextensive with the area of its focus window. That is, rather than covering a whole target image, an image frame may cover an area substantially the same as the focus window.

The image frame having the greatest contrast is identified and its associated lens position is selected as the "in focus" position to capture the target image. The contrast level of each image frame may be determined by various methods. For example, certain pixel sensors may be utilized to ascertaining which of the image frames has the greatest accumulated value of a particular characteristic (e.g., color, intensity, luma, chroma, etc.).

However, shaking of the image-capturing device 100 while auto-focusing is taking place may cause the different focus windows to capture different portions of the target image, thereby possibly resulting in a less than optimal "in focus" lens position. That is, if the focus windows capture different portions of the target image, the contrasts for the image frames may vary as a result of the different target image portions being captured rather than the lens being in better or worse focus. As a result, an inaccurate lens position may be selected and used to take a photograph of the target image.

To mitigate the effects of shaking during the auto-focus process, the auto-focus module 106 adjusts the focus windows so that they capture substantially the same target image portion. That is, at time $t_i$, a first image frame is obtained using a first focus window. At time $t_{i+1}$, a second image frame is obtained using a second focus window. A first motion vector is then obtained between the first and second image frames. That is, the displacement between the first and second image frames may be obtained by identifying common points in both images and using said common points to obtain the first motion vector. In one example, the first and second image frames may be luma channel versions of portions of the target image. The sum absolute differences between the vertical and horizontal components of the first and second image frames are obtained to ascertain the vertical and horizontal displacement between the two image frames. The first motion vector may indicate the vertical and horizontal displacement between the first and second images. At time $t_{i+2}$, a third image frame is obtained having a third focus window adjusted by the first motion vector. That is, the third focus window is "corrected" by the first motion vector so that it covers substantially the same image portion as the first focus window. While there may be some displacement between the time when the second image frame is captured and the third image frame is captured, such displacement is likely to be small if the time interval between frames is small (e.g., 15 frames per second). That is, the shaking or jittering that may be caused by a user's hand typically occurs more slowly than the time interval between frames. In this manner, a plurality of additional image frames, each image having its own focus window adjusted by a motion vector associated with a previous focus window to cover substantially the same image portion as the previous focus window.

The lens adjustment module 108 adjusts the lens 102 between a minimum and maximum range of positions as a plurality of image frames are captured at various lens positions within the range. Once the auto-focus module 106 identifies an image frame having the most contrast from a plurality of image frames, it selects a focus window associated with that image frame from the plurality of image frames. The image-capturing device 100 is then focused by using a lens position associated with the selected focus window. Once focused, the image-capturing device 100 may capture the target image.

Various examples of the image-capturing device include a mobile phone having a digital camera, a digital camera, a digital video recorder, or any other device having image-capturing and/or processing capabilities.

Figure 2:
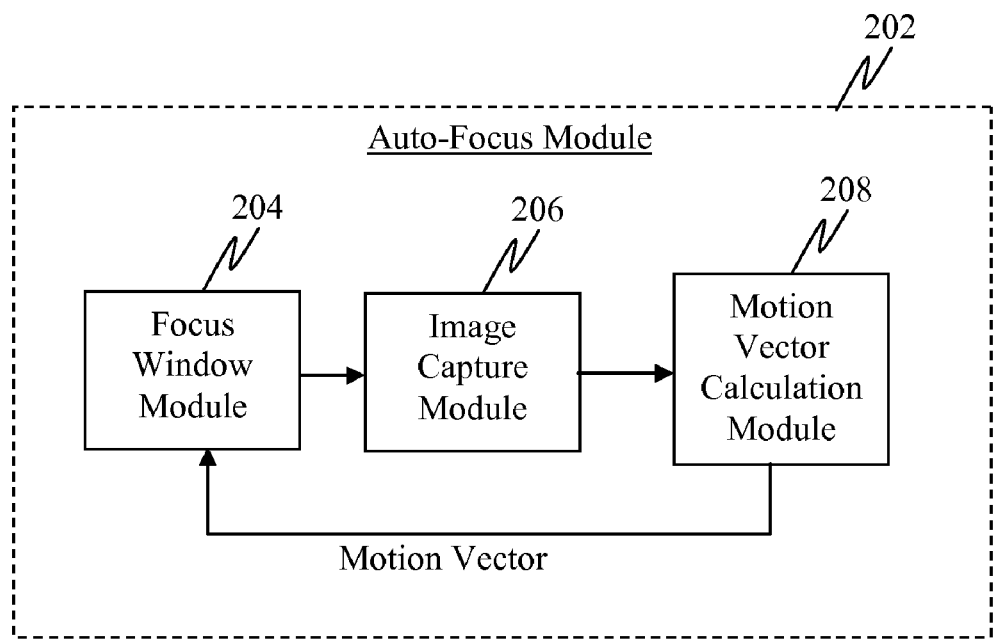
FIG. 2 is a block diagram illustrating one example of an auto-focus module for dynamically adjusting auto-focus windows to cover substantially the same portion of a target image during an auto-focusing process.

FIG. 2 is a block diagram illustrating one example of an auto-focus module for dynamically adjusting auto-focus windows to cover substantially the same portion of a target image during an auto-focusing process. The auto-focus module 202 may include a focus window module 204, an image capture module 206 and a motion vector calculation module 208. The focus window module 204 may serve to generate a focus window covering a portion of a target image. The focus window module 204 may also adjust the position of a focus window based on a motion (displacement) vector obtained from the motion vector calculation module 208. The image capture module 206 captures a plurality of image frames, wherein an image frame captures a portion of the target image. Once a first and second image frames are captured, the motion vector calculation module 208 can calculate a motion (displacement) vector between the first and second image frames. A third frame may then be adjusted based on the motion vector. That is, the third frame is displaced or corrected so that it covers substantially the same target image portion as the first image. A plurality of additional other image frames may be obtained, with each image frame being adjusted by a motion vector associated with the displacement between two immediately preceding image frames. The contrast level for each image frame is obtained and the image frame having the most contrast is identified. The lens position utilized to obtain the identified image frame is used as the "in focus" lens position to obtain a digital photograph of the target image.

Consequently, an auto-focusing image-capturing device is provided comprising: (a) means for obtaining a first image frame having a first focus window; (b) means for obtaining a second image frame having a second focus window; (c) means for obtaining a first motion vector between the first and second image; (d) means for obtaining a third image frame having a third focus window adjusted by the first motion vector to cover substantially the same image portion as the first focus window; (e) means for selecting a focus window associated with an image frame having the most contrast from the plurality of image frames; (f) means for focusing the camera by using a camera lens position associated with the selected focus window; and/or (g) means for obtaining a digital photograph using the focused camera lens position.

Figure 3:
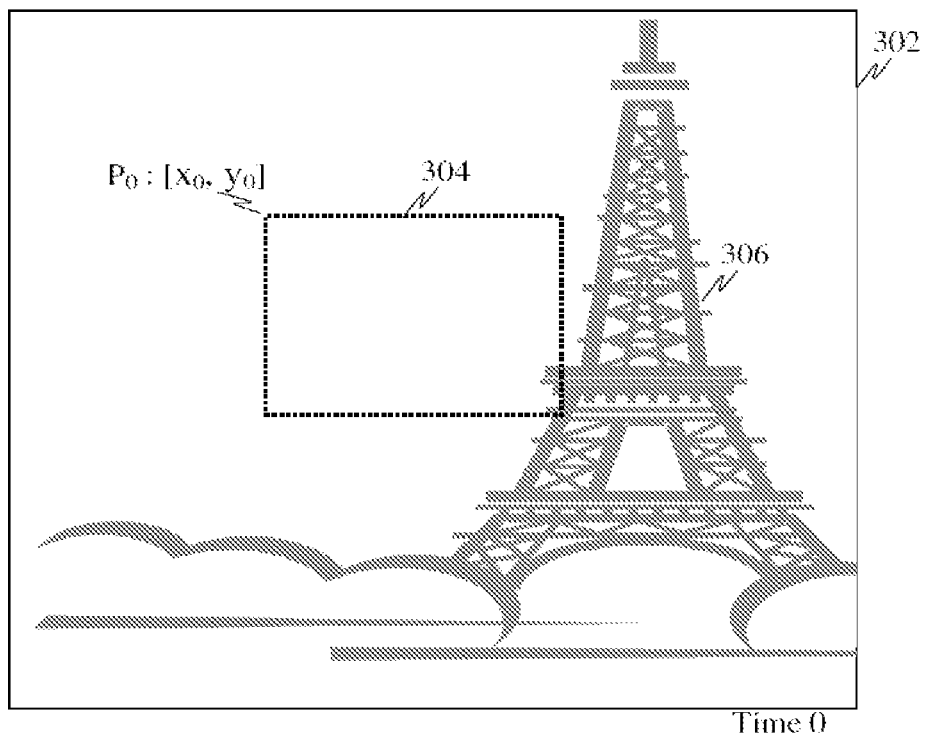
FIGS. 3, 4, and 5 illustrate how focus windows may be dynamically adjusted so that they capture substantially the same portion of a target image during an auto-focusing process.
Figure 4:
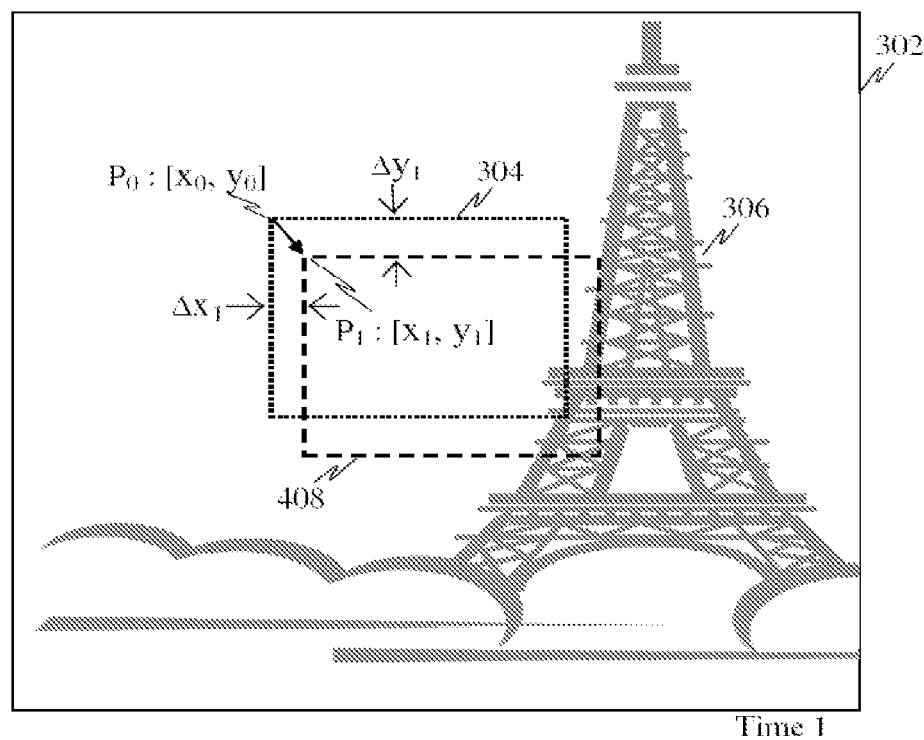
Figure 5:
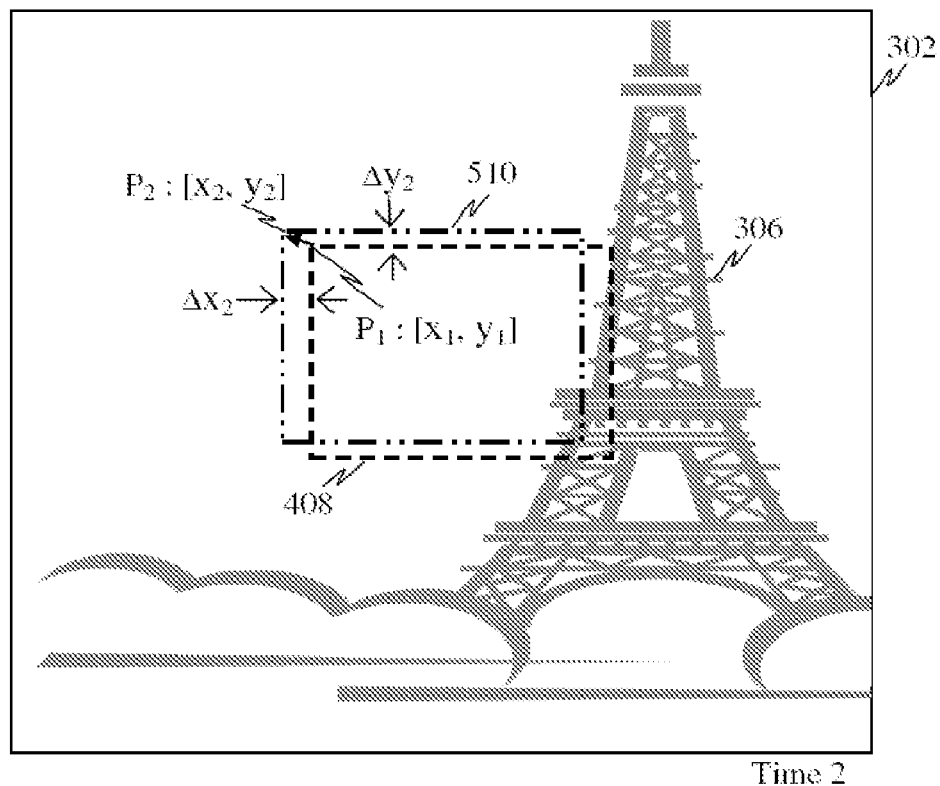

FIGS. 3, 4, and 5 illustrate how focus windows are dynamically adjusted so that they capture substantially the same portion of a target image during an auto-focusing process. FIG. 3 illustrates a target image 302 and a first focus window 304 having a reference point $P_0$ at a first position $(x_0, y_0)$ relative to the target image 302. In this image, the lower left corner of the first focus window 304 captures a small portion of the tower 306 in the target image 302. FIG. 4 illustrates how a second focus window 408, the same size as the first focus window 304, has moved or shifted so that it covers a slightly different portion of the target image 302. In this example, the second focus window 408 may cover a greater portion of the tower 306 in the target image 302. Because of the displacement of the second window frame 408 relative to the first window frame 304, the reference point $P_1$ for the second window frame 408 is at a second position $(x_1, y_1)$ relative to the target image 302. Thus, the displacement between the first and second window frames 304 and 408 may be represented by a motion vector $(x_0-x_1, y_0-y_1)$ or $(\Delta x_1, \Delta y_1)$.

FIG. 5 illustrates how a third focus window 510, the same size as the first and second focus window 304 and 408, has moved or shifted so that it covers a slightly different portion of the target image 302. For example, the reference point $P_2$ for the third focus window 510 is at a third position $(x_2, y_2)$ relative to the target image 302. In order to adjust the third focus window 510 so that it covers substantially the same portion of the target image 302 as the first focus window 304, the reference point $P_2$ for the third focus window 510 is adjusted by the motion vector $(\Delta x_1, \Delta y_1)$. That is, the reference point $P_2$ is adjusted so that $P_2=(x_2, y_2)-(\Delta x_1, \Delta y_1)$. This process is summarized as follows:

$P_0=(x_0,y_0)$ {default starting position}   {Frame 0}

$P_1=(x_1,y_1)$, and $(\Delta x_1, \Delta y_1)=(x_0-x_1, y_0-y_1)$   {Frame 1}

$P_2=(x_2,y_2)$, and $(\Delta x_2, \Delta y_2)=(x_1-x_2, y_1-y_2)$   {Frame 2}

$P_3=(x_3,y_3)$, and $(\Delta x_3, \Delta y_3)=(x_2-x_3, y_2-y_3)$   {Frame 3}

$P_j=(x_j,y_j)$, and $(\Delta x_j, \Delta y_j)=(x_{j-1}-x_j, y_{j-1}-y_j)$,   {Frame j} where j is an integer number.

The dynamic adjustment of focus windows may be performed in a plurality of focus windows to obtain image frames that capture substantially the same portion of the target image 302.

Figure 6:
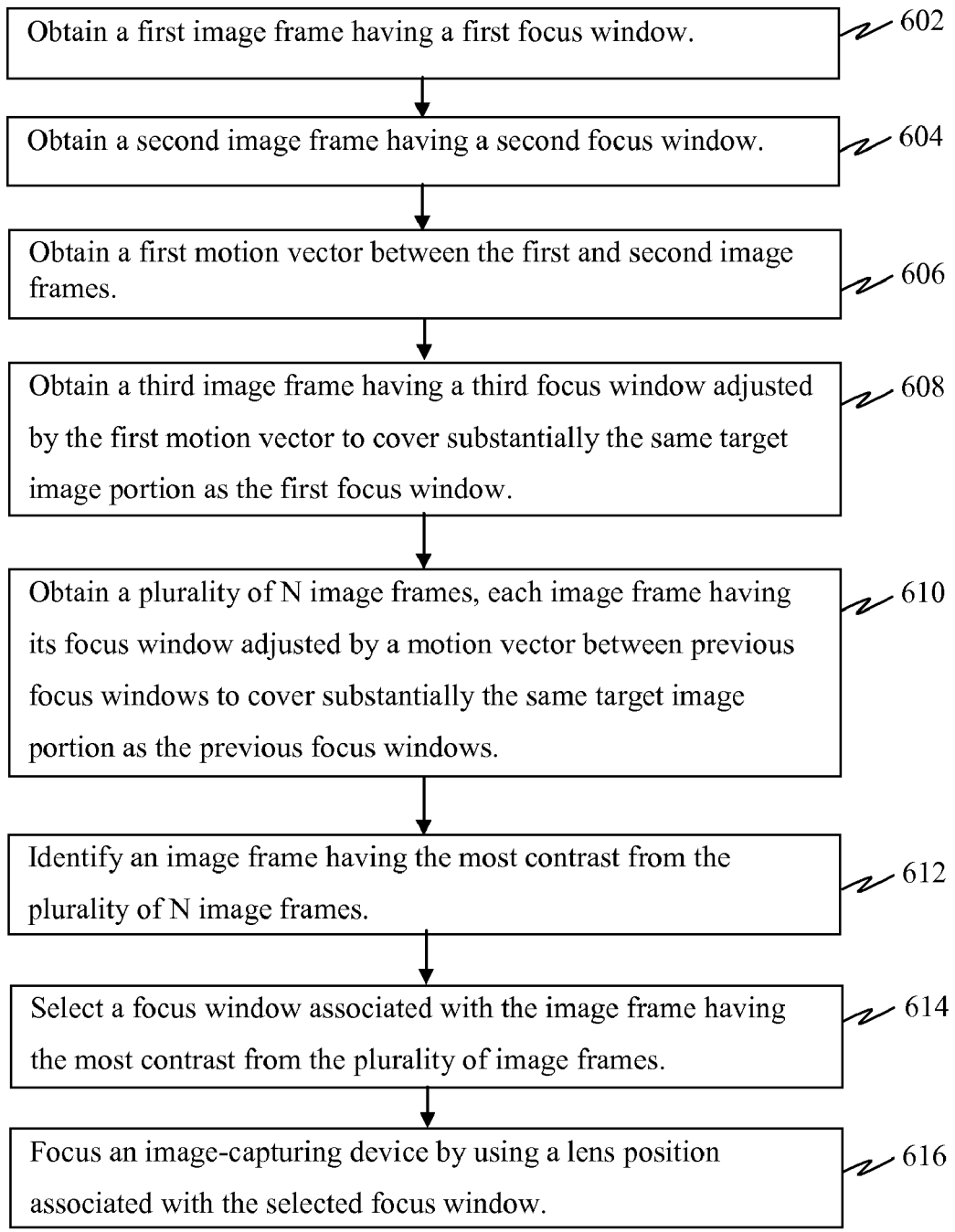
FIG. 6 illustrates a method for auto-focusing an image-capturing device using dynamically adjusted focus windows to capture substantially the same portion of a target image.

FIG. 6 illustrates a method for auto-focusing an image-capturing device using dynamically adjusted focus windows to capture substantially the same portion of a target image. A first image frame is obtained having a first focus window 602. A second image frame having a second focus window 604. The first and second focus windows may be of the same size. A first motion vector is obtained between the first and second image frames 606. For example, the first focus window may have an associated first reference point relative to the target image being photographed, and the second focus window may have an associated second reference point relative to the target image being photographed. The first motion vector is then obtained by taking the difference between the first and second reference points.

A third image frame is then obtained having a third focus window adjusted by the first motion vector to cover substantially the same target image portion as the first focus window 608. Each focus window may correspond to a different lens position for the image-capturing device.

A plurality of N image frames may also be obtained, each image frame having its focus window adjusted by a motion vector between previous focus windows to cover substantially the same target image portion as the previous focus window 610. For instance, image frame k (in the sequence of N image frames) may be adjusted by a motion vector between image frames k−1 and k−2, that immediately precede image frame k in the time sequence of N image frames. In one example, the image frames may be obtained at a frequency of fifteen (15) frames per second or greater. An image frame having the most contrast from the plurality of N image frames is identified 612. A focus window associated with the identified image frame is then selected from the plurality of image frames 614. The image-capturing device may then be focused using a lens position associated with the selected focus window 616. A digital photograph may then be obtained using the focused lens position.

Figure 7:
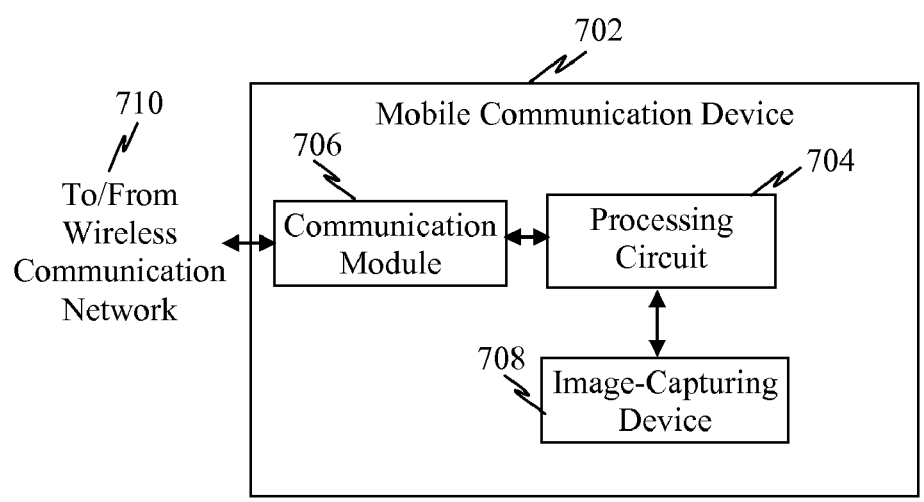
FIG. 7 is a block diagram illustrating a mobile communication device having an image-capturing device that dynamically adjusts its focus windows to capture substantially the same portion of a target image.

FIG. 7 is a block diagram illustrating a mobile communication device having an image-capturing device that dynamically adjusts its focus windows to capture substantially the same portion of a target image. The mobile communication device 702 may include a processing circuit 704, a communication module, and an image-capturing device 708. The processing circuit 704 may be configured to send and receive information through communication module 706 to/from a wireless communication network 710. Additionally, the image-capturing device may be configured to capture digital photographs. In doing so, the image-capturing device 702 may be configured to auto-focus prior to taking a digital photograph. As described in more detail in FIGS. 1-6, a lens in the image-capturing device may be moved towards and/or away from a target image while a focus window is used to capture an image frame at various lens positions. The lens position that provides an image frame with the greatest contrast levels is used as the "in focus" position. In order for the focus windows to capture substantially the same target image portion despite shaking of the mobile communication device 702, motion vectors are calculated for preceding image frames and used to correct the location of a subsequent focus window so that the focus windows cover substantially the same portion of the target image.

One or more of the components, operations, and/or functions illustrated in FIGS. 1-18 may be rearranged and/or combined into a single component, operation, and/or function or separated into several components, operations, and/or functions without departing from the spirit and/or scope of the disclosure. Additional elements, components, operations, and/or functions may also be added without departing from the spirit and/or scope of the disclosure. The apparatus, devices, and/or components illustrated in FIGS. 1, 2, and/or 7 may be configured to perform one or more of the methods, features, or operations described in FIGS. 3, 4, 5, and/or 6.

Those of skill would further appreciate that the various illustrative logical blocks, modules, circuits, and algorithm operations described in connection with the examples disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system.

It should be noted that the foregoing configurations are merely examples and are not to be construed as limiting the spirit and/or scope of the disclosure. The description of these examples is intended to be illustrative, and not to limit the scope of the claims. As such, the present teachings can be readily applied to other types of apparatuses and many alternatives, modifications, and variations will be apparent to those skilled in the art.

What is claimed is:

1. A method for auto-focusing an image, wherein the image is captured through a lens, comprising:
   obtaining a first image frame having a first focus window;
   moving the lens from a first position to a second position;
   obtaining a second image frame having a second focus window;
   obtaining a first motion vector between the first and second image frames;
   obtaining a third image frame having a third focus window adjusted by the first motion vector to cover substantially the same target image portion as the first focus window; and
   comparing the target image in the third focus window with the target image in the first focus window to auto-focus the lens.

2. The method of claim 1 further comprising:
   obtaining a plurality of image frames with different lens positions, each image frame having its focus window adjusted by an associated motion vector between previous focus windows to cover substantially the same target image portion as the previous focus windows.

3. The method of claim 2 wherein the previous focus windows immediately precede the image frame that has its focus window adjusted by the motion vector.

4. The method of claim 2 further comprising:
   selecting a focus window having the most contrast from the plurality of image frames; and
   focusing the image-capturing device by using a lens position associated with the selected focus window.

5. The method of claim 4 further comprising:
   obtaining a digital photograph using the lens position.

6. The method of claim 2 further comprising:
   identifying a focus window having the most contrast from the plurality of image frames.

7. The method of claim 2 wherein the method is performed in a cell phone.

8. The method of claim 1 wherein the image frames are obtained at a frequency of fifteen (15) frames per second or greater.

9. The method of claim 1 wherein the first focus window has an associated first reference point relative to an image being photographed, and the second focus window has an associated second reference point relative to an image being photographed, the first motion vector obtained by taking the difference between the first and second reference points.

10. The method of claim 1 wherein a focus window covers only a portion of an image being photographed.

11. An image-capturing device, comprising:
    means for obtaining a first image frame having a first focus window;
    means for moving the lens from a first position to a second position;
    means for obtaining a second image frame having a second focus window;
    means for obtaining a first motion vector between the first and second image frames;
    means for obtaining a third image frame having a third focus window adjusted by the first motion vector to cover substantially the same image portion as the first focus window; and
    means for comparing the target image in the third focus window with the target image in the first focus window to auto-focus the lens.

12. The device of claim 11 further comprising:
    means for obtaining a plurality of image frames at different lens positions, each image frame having its focus window adjusted by an associated motion vector between previous focus windows to cover substantially the same target image portion as the previous focus windows.

13. The device of claim 12 further comprising:
    means for selecting a focus window having the most contrast from the plurality of image frames; and
    means for focusing the image-capturing device using a lens position associated with the selected focus window.

14. The device of claim 13 further comprising:
means for obtaining a digital photograph using the lens position.

15. The device of claim 11 wherein the first focus window has an associated first reference point relative to an image being photographed, and the second focus window has an associated second reference point relative to an image being photographed, the first motion vector obtained by taking the difference between the first and second reference points.

16. An image-capturing device, comprising:
an image sensor for capturing image frames; and
an auto-focus module coupled to the image sensor, the auto-focus module configured to obtain a first image frame having a first focus window;
move the lens from a first position to a second position;
obtain a second image frame having a second focus window;
obtain a first motion vector between the first and second image frames;
obtain a third image frame having a third focus window adjusted by the first motion vector to cover substantially the same target image portion as the first focus window; and
compare the target image in the third focus window with the target image in the first focus window to auto-focus the lens.

17. The device of claim 16 wherein the auto-focus module is further configured to
obtain a plurality of image frames with different lens positions, each image frame having its focus window adjusted by an associated motion vector between previous focus windows to cover substantially the same target image portion as the previous focus windows.

18. The device of claim 17 wherein the auto-focus module is further configured to
identify a focus window having the most contrast from the plurality of image frames;
select a focus window having the most contrast from the plurality of image frames; and
focus the image-capturing device by using a lens position associated with the selected focus window.

19. The device of claim 16 wherein the first focus window has an associated first reference point relative to an image being photographed, and the second focus window has an associated second reference point relative to an image being photographed, the first motion vector obtained by taking the difference between the first and second reference points.

20. The device of claim 16, wherein the device is a cell phone.

21. The device of claim 16 wherein a focus window covers only a portion of an image being photographed.

22. The device of claim 16 wherein the image frames are obtained at a frequency of fifteen (15) frames per second or greater.

23. The device of claim 16 wherein the auto-focus module includes:
a focus window module to determine the focus windows;
an image capture module to capture the image frames; and
a motion vector calculation module to obtain motion vectors between an image frame and a previous image frame.

24. A computer-readable medium having one or more instructions operational on an image-capturing device to mitigate the effects of shaking during auto-focusing, which when executed by a processor causes the processor to:
obtain a first image frame having a first focus window;
move the lens from a first position to a second position;
obtain a second image frame having a second focus window;
obtain a first motion vector between the first and second image frames;
obtain a third image frame having a third focus window adjusted by the first motion vector to cover substantially the same image portion as the first focus window; and
compare the target image in the third focus window with the target image in the first focus window to auto-focus the lens.

25. The computer-readable medium of claim 24 having one or more instructions which when executed by a processor causes the processor to further:
obtaining a plurality of image frames with different lens positions, each image frame having its focus window adjusted by an associated motion vector between previous focus windows to cover substantially the same target image portion as the previous focus windows.

26. The computer-readable medium of claim 25 having one or more instructions which when executed by a processor causes the processor to further:
identify a focus window having the most contrast from the plurality of image frames;
select a focus window having the most contrast from the plurality of image frames; and
focus the image-capturing device by using a lens position associated with the selected focus window.

27. The computer-readable medium of claim 25 wherein the first focus window has an associated first reference point relative to an image being photographed, and the second focus window has an associated second reference point relative to an image being photographed, the first motion vector obtained by taking the difference between the first and second reference points.

28. The computer-readable medium of claim 24, wherein the image capturing device is a cell phone.

29. The computer-readable medium of claim 24 wherein a focus window covers only a portion of an image being photographed.

30. The computer-readable medium of claim 24 wherein the image frames are obtained at a frequency of fifteen (15) frames per second or greater.

* * * * *

UNITED STATES PATENT AND TRADEMARK OFFICE
CERTIFICATE OF CORRECTION

| | | |
|---|---|---|
| PATENT NO. | : 7,634,187 B2 | Page 1 of 1 |
| APPLICATION NO. | : 11/619694 | |
| DATED | : December 15, 2009 | |
| INVENTOR(S) | : Li et al. | |

It is certified that error appears in the above-identified patent and that said Letters Patent is hereby corrected as shown below:

Column 12, line 27, Claim 25: "obtaining a plurality" to read as --obtain a plurality--

Signed and Sealed this
Twenty-fourth Day of May, 2011

David J. Kappos
*Director of the United States Patent and Trademark Office*